United States Patent
Shen et al.

(10) Patent No.: US 7,376,901 B2
(45) Date of Patent: May 20, 2008

(54) CONTROLLED INTERACTIVE DISPLAY OF CONTENT USING NETWORKED COMPUTER DEVICES

(75) Inventors: Chia Shen, Lexington, MA (US); Kathleen Ryall, Cambridge, MA (US); Katherine Everitt, Vancouver (CA)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 826 days.

(21) Appl. No.: 10/610,140

(22) Filed: Jun. 30, 2003

(65) Prior Publication Data

US 2004/0267873 A1    Dec. 30, 2004

(51) Int. Cl.
*H04L 29/06* (2006.01)
*G06F 5/00* (2006.01)

(52) U.S. Cl. .................... 715/751; 715/803

(58) Field of Classification Search .......... 715/751, 715/753–754, 755–759, 792, 794, 734, 737, 715/771, 773, 741, 742, 743, 749, 752, 736–738, 715/854, 708, 740, 803–804; 705/13; 701/29; 707/204; 709/200, 223, 225

See application file for complete search history.

(56) References Cited

U.S. PATENT DOCUMENTS

| | | | |
|---|---|---|---|
| 6,313,852 B1 * | 11/2001 | Ishizaki et al. | 715/751 |
| 6,369,840 B1 * | 4/2002 | Barnett et al. | 715/853 |
| 6,522,347 B1 * | 2/2003 | Tsuji et al. | 715/848 |
| 6,732,170 B2 * | 5/2004 | Miyake et al. | 709/223 |
| 6,901,379 B1 * | 5/2005 | Balter et al. | 705/27 |
| 6,957,186 B1 * | 10/2005 | Guheen et al. | 705/1 |
| 7,003,728 B2 * | 2/2006 | Berque | 715/753 |

(Continued)

OTHER PUBLICATIONS

Greenberg, et al., "PDAs and shared public displays: Making personal information public, and public information personal," Personal Technologies, vol. 3, No. 1, Mar. 1999.

(Continued)

*Primary Examiner*—Steven P. Sax
(74) *Attorney, Agent, or Firm*—Dirk Brinkman; Clifton D. Mueller; Gene V. Vinokur

(57) ABSTRACT

The invention provides a novel method for interacting with content objects stored in computer devices connected as nodes of a communications network, each node including an input interface and an output interface, the output interface including a display area. A first display area of a first node is partitioned into a first private work area and a first personal work area associated with the first node. A second display area of a second node is partitioned into a set of second personal work areas and a public work area, each second personal work area associated with other nodes and the public work area associated with all of the nodes.

A particular content object of the first node in the first private work area is visualized as a content item according to attributes enabled by the visualizing and moved from the first private work area to the first personal work area. In response to the first moving, the content item in the corresponding second personal work area is visualized according to attributes enabled by the first moving. The content item is then moved from the second personal work area to the public personal work area and visualized, in response to the second moving, in the public work area according to attributes enabled by the second moving.

7 Claims, 4 Drawing Sheets

U.S. PATENT DOCUMENTS

| | | | |
|---|---|---|---|
| 7,010,755 B2* | 3/2006 | Anderson et al. | 715/778 |
| 7,149,980 B1* | 12/2006 | Nelson et al. | 715/764 |
| 2001/0042118 A1* | 11/2001 | Miyake et al. | 709/223 |
| 2004/0162807 A1* | 8/2004 | Montagne | 707/1 |
| 2005/0038868 A1* | 2/2005 | Spicer | 709/217 |
| 2006/0117264 A1* | 6/2006 | Beaton et al. | 715/751 |

OTHER PUBLICATIONS

Tandler, et al. "ConnecTables:Dynamic coupling of displays for the flexible creation of shared workspaces," Proceedings 14th Annual Symposium on User Interface Software and Technology (UIST'01), pp. 11-20, 2001.

* cited by examiner

CONTROLLED INTERACTIVE DISPLAY OF CONTENT USING NETWORKED COMPUTER DEVICES

FIELD OF THE INVENTION

The present invention relates generally to computer-implemented presentations systems, and more particularly to multi-user interactive display systems.

BACKGROUND OF THE INVENTION

Sharing information in a collaborative setting is an important aspect of many professional and social interactions. Managers and staff collaborate on projects, sales people make presentations to potential customers, attorneys negotiate dispute resolutions, and family members share photographs of memorable events in their lives.

The means for exchanging information can be as simple as paper documents or pictures arranged on a table top. However, computer technology has evolved from providing a stationary resource located on a desktop in the office or home, to a highly mobile resource embodied in such devices as laptop computers, personal digital assistants (PAD's), and cellular telephones accessing digitized content, e.g., text, images, videos, etc. There, the content can be displayed on the device itself for private viewing, or on a public display areas for shared viewing. However, in such collaborative interactions, the 'owner' of the content may want to retain some control of how the content is manipulated for display, and how the underlying content is accessed and modified.

Green berg, et al. In "*Interactive PADS and Shared Public Displays: Making Personal Information Public, and Public Information Personal,*" Personal Technologies, Vol.3, No.1, 1999, describe a number of prior art systems that exchange electronic content in collaborative environments.

Generally described, those prior art systems set rigid and simplistic rules for categorizing content as either public or private. Further, they fail to enable fast, efficient methods for sharing the content. Conventional interactive systems do not provide an effective means for interacting with the content because the strict nature of the categorizations limit the access to certain content. This limitation arises because those conventional systems have only two modes of operation, a private mode and a public mode. A single participant often generates the content only for private use. Occasionally, some of the content is made available for public use. However, when the content is publicly used, the owner has, in most cases, absolutely no control over the manner of public use.

In view of these limitations of prior art collaborative systems, there is a need for an improved method and system that allows multiple users to interact with and share electronic content in a collaborative setting.

SUMMARY OF THE INVENTION

The invention provides a novel method for interacting with content objects stored in computer devices connected as nodes of a communications network, each node including an input interface and an output interface, the output interface including a display area. A first display area of a first node is partitioned into a first private work area and a first personal work area associated with the first node. A second display area of a second node is partitioned into a set of second personal work areas and a public work area, each second personal work area associated with other nodes and the public work area associated with all of the nodes.

A particular content object of the first node in the first private work area is visualized as a content item according to attributes enabled by the visualizing and moved from the first private work area to the first personal work area. In response to the first moving, the content item in the corresponding second personal work area is visualized according to attributes enabled by the first moving.

The content item is then moved from the second personal work area to the public personal work area and visualized, in response to the second moving, in the public work area according to attributes enabled by the second moving.

DETAILED DESCRIPTION OF THE PREFERRED EMBODIMENT

System Structure

Figure 1:
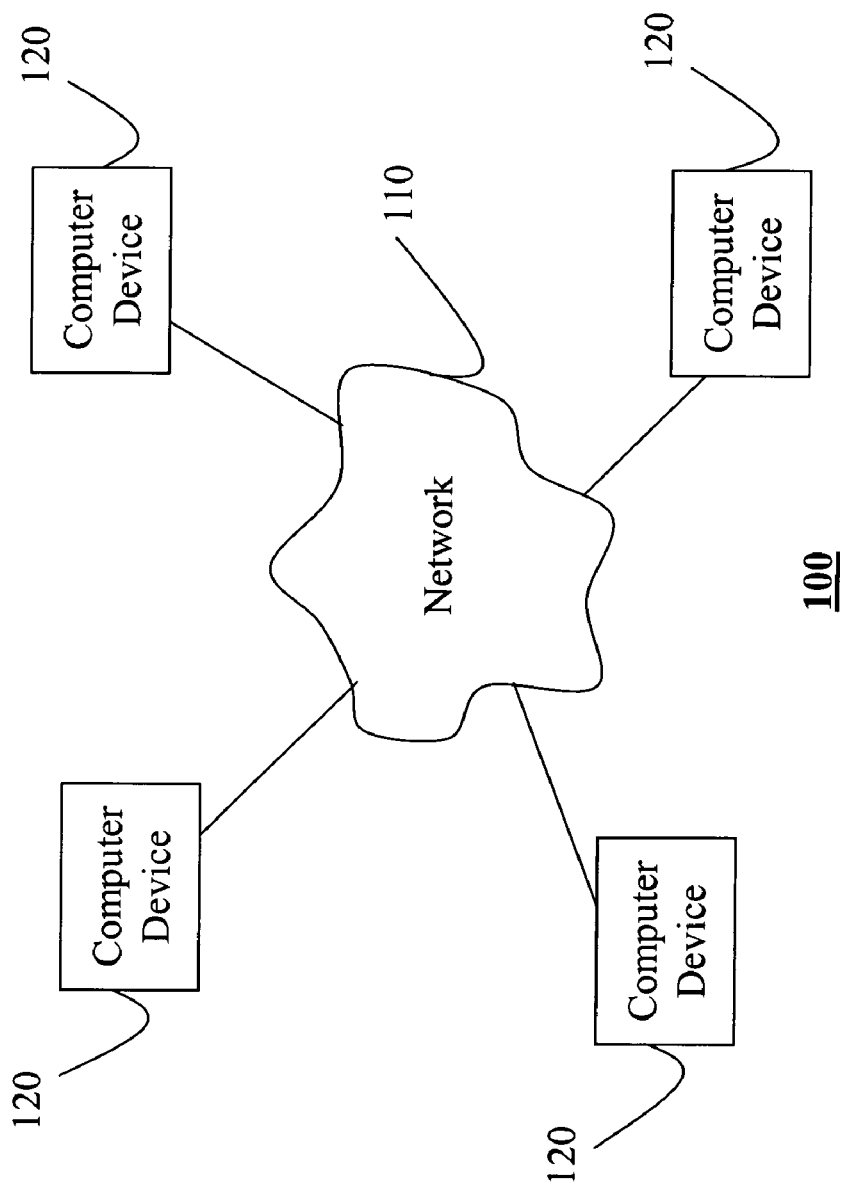
FIG. 1 is a block diagram of an interactive display system according to the invention.

FIG. 1 shows an interactive display system 100 according to the invention. The system 100 includes multiple computer devices 120, hereinafter "nodes" connected to each other by a network 110.

Figure 2:
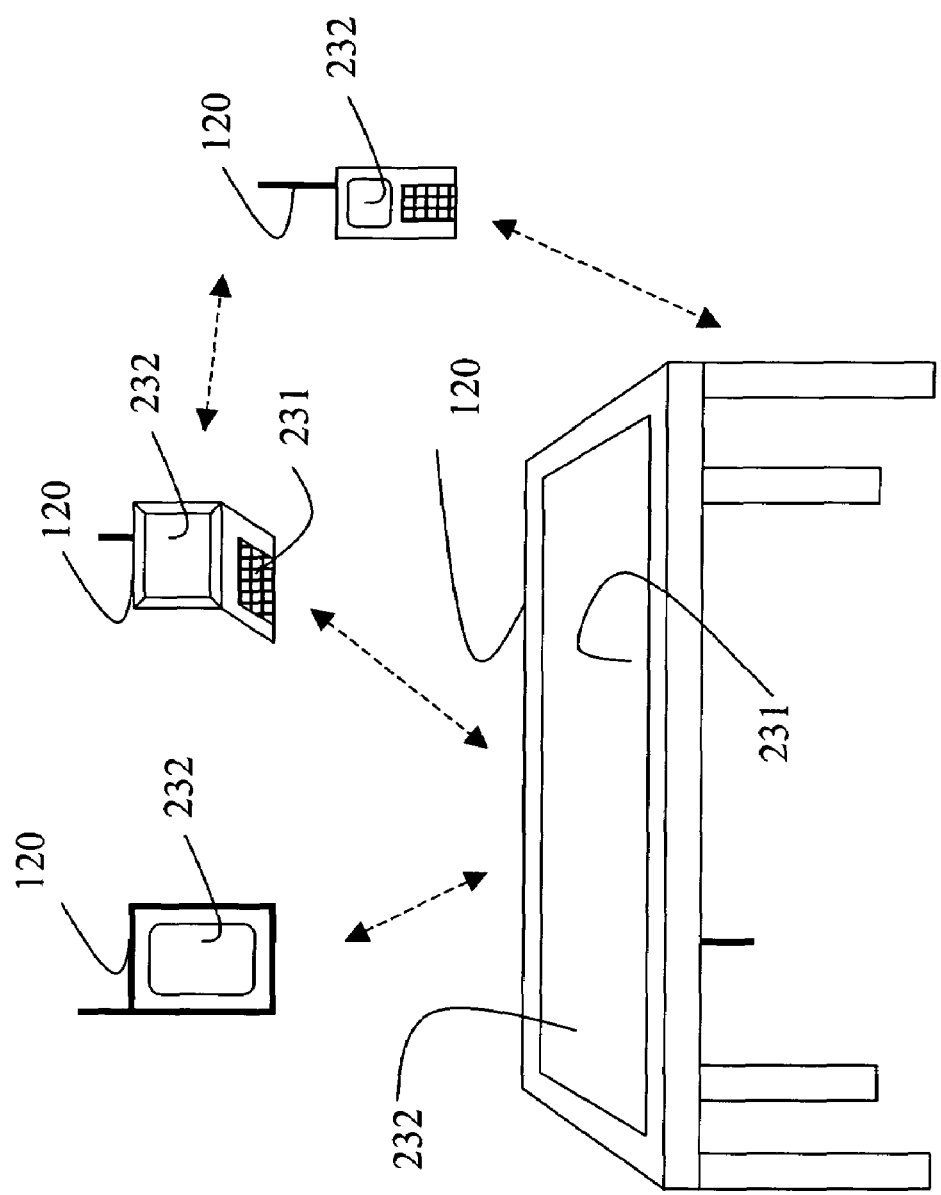
FIG. 2 is a schematic of the system of FIG. 1.

FIG. 2 shows one embodiment of the system according to the invention. The nodes 120 include a personal digital assistants (PAD), a laptop computer, a cellular telephone, and in-table-mounted computer. Each node includes an input interface 231, e.g., a keyboard, mouse, touch sensitive surface, or combinations thereof, and an output interface 232, i.e., a display area. The display areas can also be in various forms, e.g., CRT, LAD, and rear or front projected. The nodes communicate with each other via, e.g., a wired or wireless network.

Node and Data Structures

Figure 3:
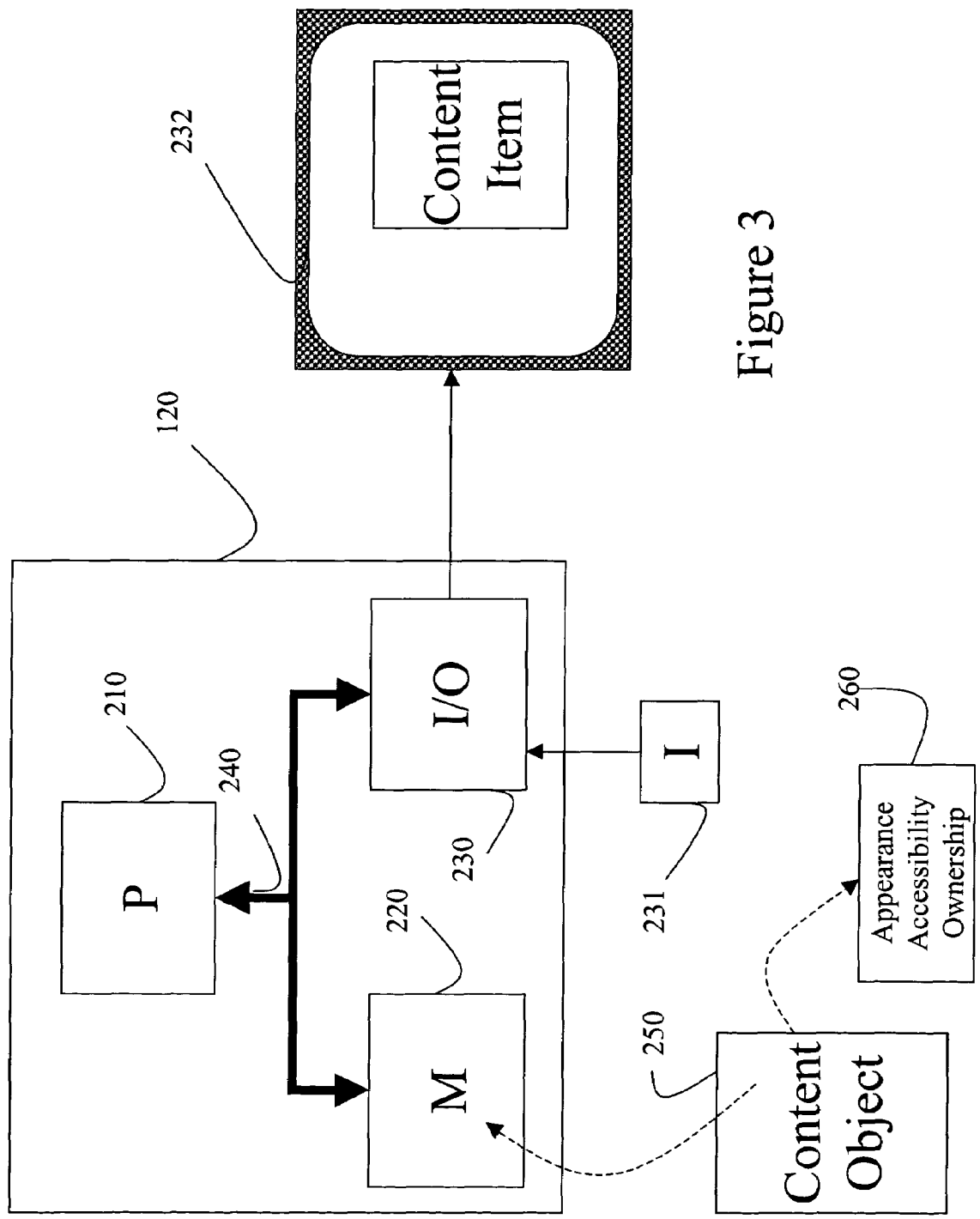
FIG. 3 is a block diagram of a computer device according to the invention.

FIG. 3 shows the general structure of one node 120. The node includes a processor (P) 210, a memory (M) 220, and an I/O module 230 connected to each other by buses 240. The I/O module connects to the input and output interfaces. The memories of the various nodes can store multi-media content objects 250, e.g., documents, files, images, videos, etc. The content objects are visualized as content items 440. The visualization can be an actual direct rendering of the content, or an indirect rendering of the content as icons representing the content objects.

Content

Each content object 250 has sets 260 of appearance, accessibility and ownership attributes. These attributes control the interactive visualization of the objects 250 as items 440 on the output interfaces 232 using the input interfaces 231. The attribute of the content objects 250 are enabled on a per node basis.

Attributes of Content

Appearance attributes control the visualization of the content objects as content items, e.g., the location, orientation, size of the items, without modifying the underlying content object.

Accessibility attributes temporarily control the content objects directly, e.g., read, write, modify, delete. These operations can indirectly control the visualization of the corresponding items. Persistent control of the content is managed by the ownership attributes.

Display and Work Areas

Figure 4:
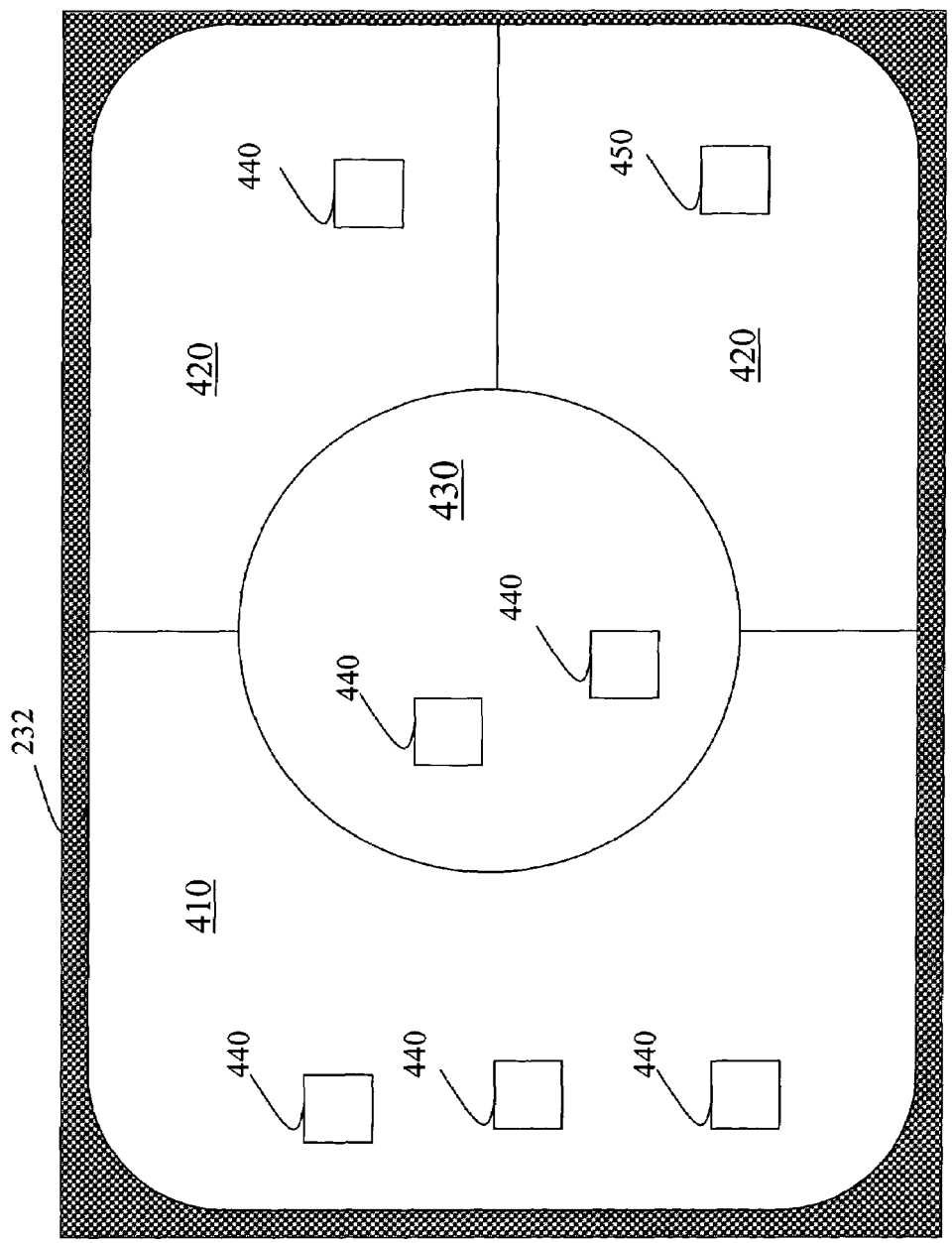
FIG. 4 is a block diagram of display and work areas according to the invention.

FIG. 4 shows a partitioning of the display area 232 into work areas according to the invention. A particular display area 232 can include one private work area 410 associated with the node itself, a set of personal work areas 420 associated with other nodes participating in the collaboration, and a set of unassociated public work areas 430.

The private work area operates much like a conventional 'desk top.' The user visualizes items in the private work area by 'opening' the underlying content objects. The items are removed by a 'closing' or 'delete' operation. There is no analogy in the prior art for the personal and public work areas.

The work areas are used to visualize the content objects 250 as content items 440. The work areas can have identification characteristics to identify the corresponding nodes and owners. For example, a personal work area of a particular node can have the same background color as the associated private work area. The public work area, not associated with any node, can have a neutral background color.

The idea of the invention is to 'share' both the content objects and their visualization as content items among work areas of several collaborating nodes. However, one object of the invention is to interactively collaborate in a controlled manner, so that each individual user have complete control over who sees what, and to what extent other users can manipulate what starts out as being private content.

Enabling Attributes

Only a user of a node enabled with ownership attribute of the stored content objects can enable attributes of that content for other nodes. Attributes can be enabled directly and indirectly. In a direct way, the owner uses the input interface, e.g., the keyboard or mouse, to set the attributes.

Of special interest to the invention is the indirect enabling of attribute by manipulating the content items in the various display areas.

After a user selects a particular content object for visualization in the private work area of a particular node, then the item can be enabled for another node by moving it from the private work area to the personal work area associated with another node. This causes the content item to appear in the corresponding personal work area of the other node and attributes are partially enabled for that node. Moving the item to the public work area enables additional attributes for all users of the system.

An owner of an item can enable ownership of content objects and items to another user by moving the item to that user's personal work area. In this case, another instance of the object and item is generated. The original owner can retain control over the original content.

After an item appears in a personal or public work area, authorized user, e.g., the owner or Co.-owners can change the attributes by moving the item over or through icons representing various attribute changes. The attributes can also be changed using a 'drop-down' menu. One such icon can represent the fact that all attributes are enabled for all users, so that the content and item can be changed in any way by any user.

It is to be understood that various other adaptations and modifications may be made within the spirit and scope of the invention. Therefore, it is the object of the appended claims to cover all such variations and modifications as come within the true spirit and scope of the invention.

We claim:

1. A method for sharing content objects stored in computer devices connected as nodes of a communications network, comprising the steps of:

providing a plurality of nodes connected in a network, each node including an input interface and an output interface, the output interface including a display area, the display area including a private work area, a public work area and a set of personal work areas, in which the set of personal work areas for each node includes all of the different personnel work areas corresponding to every node in the network;

displaying a content object as a content item in a first work area of a node;

reacting on a movement of the content item from the first work area to a second work area, the reacting further comprising:

first visualizing a content object in the private work area of the node as a first content item according to attributes enabled by the first visualizing, if the second work is the private work of the node;

second visualizing the content object in the personal work areas of the plurality of nodes as second content items according to attributes enabled by the second visualizing, if the second work is a personal work of the node; and third visualizing the content object in the public work areas of the plurality of nodes as third content items according to attributes enabled by the third visualizing, if the content item is moved to the public work area of the node.

2. The method of claim 1, in which the attributes include appearance, accessibility and ownership attributes.

3. The method of claim 2, in which the appearance attributes control a location, an orientation, and a size of the content item.

4. The method of claim 2, in which the accessibility attributes control read, write, modify, and delete operations on the content item.

5. The method of claim 1, further comprising:

associating identification characteristics with the work areas, the identification characteristics identifying owners and nodes.

6. The method of claim 5, in which the identification characteristics are colors of the work areas.

7. The method of claim 1, in which only a user of a particular node enabled with an ownership attribute of a particular content item can enable the attributes of the particular content item for another node.

* * * * *